Figures 1, 2:
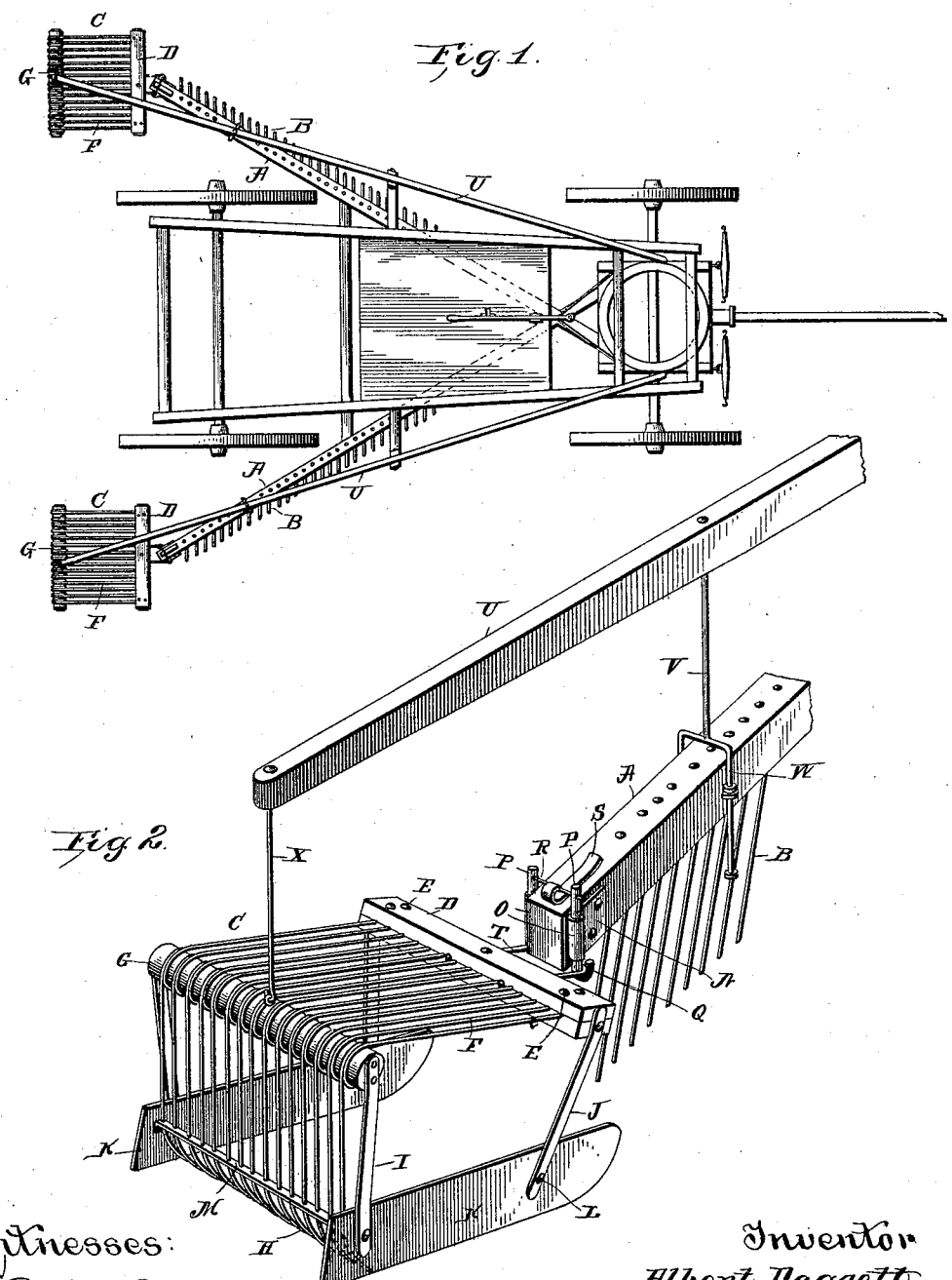

(No Model.)

A. DAGGETT.
DRAG RAKE FOR ROAD BEDS.

No. 575,635. Patented Jan. 19, 1897.

Witnesses:
E. C. Wundeman
S. J. Williamson

Inventor
Albert Daggett
by Geo. H. Holgate
Attorney

UNITED STATES PATENT OFFICE.

ALBERT DAGGETT, OF STRONG, MAINE.

DRAG-RAKE FOR ROAD-BEDS.

SPECIFICATION forming part of Letters Patent No. 575,635, dated January 19, 1897.

Application filed August 22, 1896. Serial No. 603,588. (No model.)

*To all whom it may concern:*

Be it known that I, ALBERT DAGGETT, a citizen of the United States, residing at Strong, in the county of Franklin and State of Maine, have invented certain new and useful Improvements in Drag-Rakes for Road-Rakes, of which the following is a specification.

My invention relates to a new and useful improvement in attachment for road-rakes, such as shown in Patent No. 553,749, granted to me upon the 28th day of January, 1896, and has for its object to provide means whereby the stones or rough dirt forced to each side of the above-named rake may be collected and held until a sufficient quantity has been gathered to make a small heap thereof, which may then be released in order that they may be readily loaded into carts for transporting or removal from the road-bed.

With these ends in view my invention consists in the details of construction and combination of elements hereinafter set forth and then specifically designated by the claims.

In order that those skilled in the art to which this invention appertains may understand how to make and use the same, I will describe its construction and operation in detail, referring by letter to the accompanying drawings, forming a part of this specification, in which—

Figure 1 is a plan view of the rake shown and described in the above-mentioned patent, illustrating the relative position of my present improvement when attached thereto; and Fig. 2, a detailed perspective of one of the drag-rakes attached to the rear end of one of the rails of the road-rake.

Referring to the drawings in detail, A designates the rails of the rake, in which the teeth B are set, and to the rear end of each of these rails is attached a drag-rake C, which is constructed as follows:

A head-bar D is composed of two strips of wood, which are secured together by suitable bolts E, and between these strips are fastened the inner ends of the spring-rods F. The rods F extend rearward and are coiled once around a cylinder G, and then pass downward, terminating in inwardly-curved ends H. The runners K serve to inclose the lower portion of each of the drag-rakes, and have secured thereto a strap M, which holds the runners from spreading, and through which are perforations for the passage of the lower portion of the rods F, in order that said rods may be held in their proper relative position to each other and at the same time given a limited amount of play, whereby they will be permitted to adapt themselves to the unevenness in the road-bed over which they may pass.

To the rear end of each of the rails A are secured two plates N, having eyes O formed thereon, through which pass the shanks P of the hooks Q, the upper ends of the shanks being connected by a rod R, which has pivoted thereto a cam-lever S, so arranged that when it is turned down parallel with the rail, as shown in Fig. 2, the hooks will be elevated, thus closing their open ends, and as the collectors are attached to the rake by means of the wires or ropes T this closing of the open ends of the hooks will prevent this wire from being disengaged from said hooks, yet when it is desired to detach the collectors from the rake this may be accomplished by the swinging up of the cam-levers S, which will prevent the downward movement of the hook, so opening their ends that the wires T may be disengaged therefrom.

U represents the levers by which the rails may be elevated, and they are connected to said rails by the rods V, passing through eyebolts in the rails, or other means, so as to have a certain amount of loose motion between the levers U and the rails, the object of which is to permit the elevation of the cylinders G by said levers through the connections X, which are attached to the outer ends of the levers and to said cylinders, so that it will be seen that when it is necessary to raise the lower ends of the rods F out of contact with the ground it is only necessary to bear upon the inner ends of the levers U, thereby elevating the outer ends thereof sufficiently to bring about the required result without lifting the rails, yet when it is desirable to lift said rails a continued movement of the levers will effect this result.

From this description it will be seen that as the rake is drawn forward over the road-bed the stones and rough dirt collected thereby will be thrown to each side, and the collectors following the rails of the rake will gather said material by the action of the curved ends of the spring-rods F, and this material will be prevented from spreading by the runners K, the front ends of which are rounded, so as to facilitate their movement over the road-bed and also the lifting of the lower ends of the rods F from the road-bed, at which time the rounded ends of the runners will act as fulcrums upon which said runners are swung. When a sufficient quantity of material has been gathered by the collectors, it is dumped by the elevation of said collectors, as before described, without elevating the rake-teeth out of contact with the road-bed, whereby the action of said teeth will not be interrupted. Material thus gathered may be readily loaded into carts or otherwise disposed of.

Having thus fully described this invention, what is claimed as new and useful is—

1. In combination with a road-rake of the character described, a drag-rake attached to the rear end of each of the rails of the first-named rake adapted to gather the material left by said rake and place it in piles, as shown and described.

2. In combination with a rake of the character described, one or more drag-rakes adapted to be attached to the rear ends of the rails of the first-named rake, said drag-rake consisting of two runners, and a series of rods, the lower ends of which are curved and adapted to come into contact with the road-bed over which they have passed, substantially as and for the purpose set forth.

3. A drag-rake for use in connection with a road-rake of the character described, consisting of the runners K, a cylinder G supporting said runner, a head D also supporting said runners, and spring-rods attached to said head and coiled about said cylinder, their lower ends being curved and adapted to engage the surface of the road-bed over which they are drawn, substantially as and for the purpose set forth.

4. The herein-described combination of a drag-rake consisting of the runners K, uprights I and J, cylinder G, a head D, rods F attached to said head and coiled once around said cylinder, the lower ends of said rods being curved, a flexible strap M through which said rods pass, with the hooks Q having shanks P, a cam for elevating said shanks, and a lever U loosely attached to the rail W and connected by the rod X to the cylinder, all arranged substantially as and for the purposes set forth.

In testimony whereof I have hereunto affixed my signature in the presence of two subscribing witnesses.

ALBERT DAGGETT.

Witnesses:
S. S. WILLIAMSON,
R. M. PIERCE.